J. E. LEDERMAN.
ENVELOP SEALING AND STAMPING MACHINE.
APPLICATION FILED JUNE 24, 1912.
1,157,113.
Patented Oct. 19, 1915.
2 SHEETS—SHEET 1.
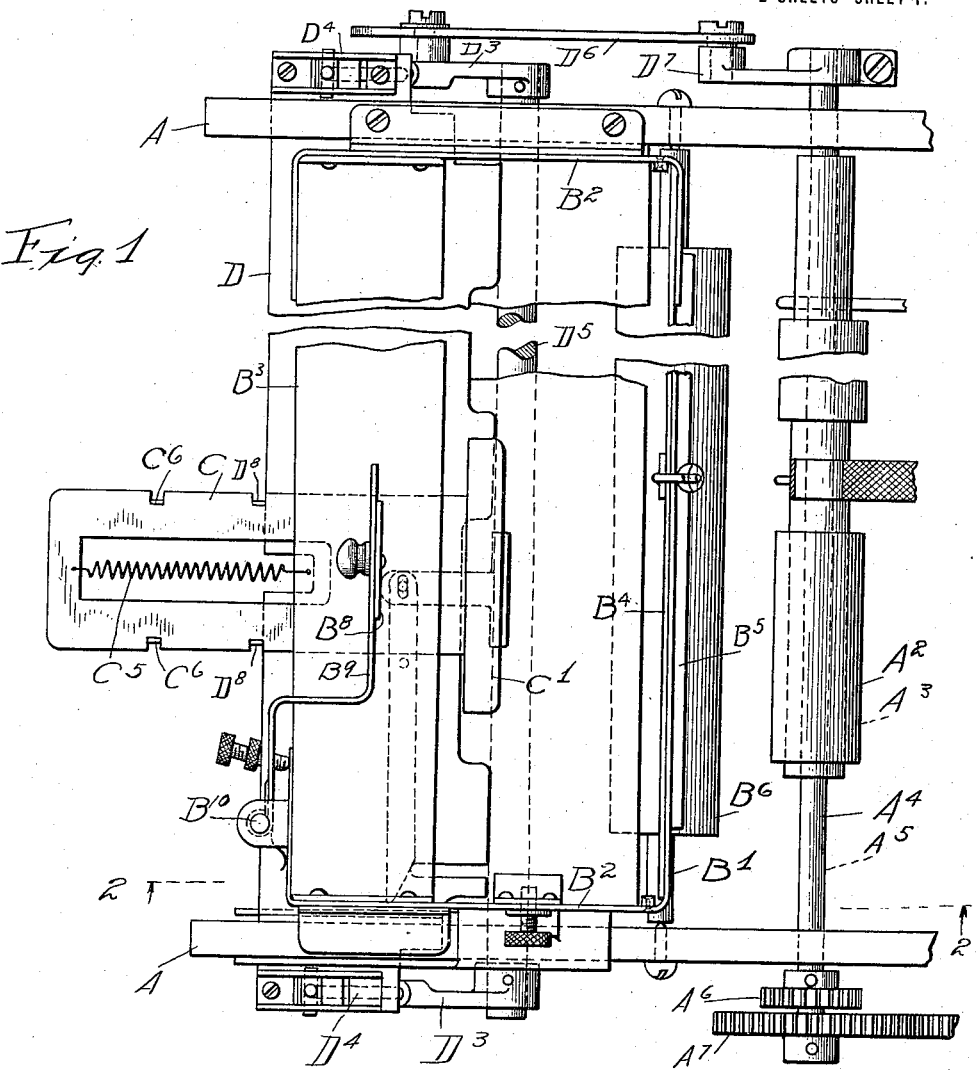
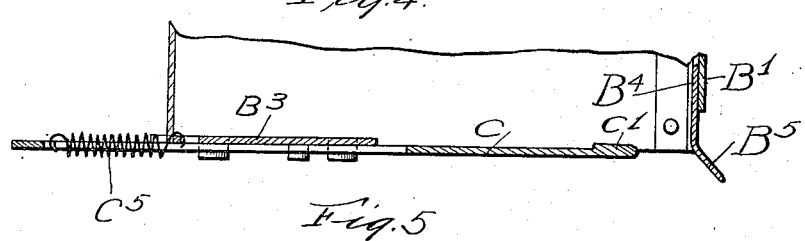

J. E. LEDERMAN.
ENVELOP SEALING AND STAMPING MACHINE.
APPLICATION FILED JUNE 24, 1912.
1,157,113.
Patented Oct. 19, 1915.
2 SHEETS—SHEET 2.
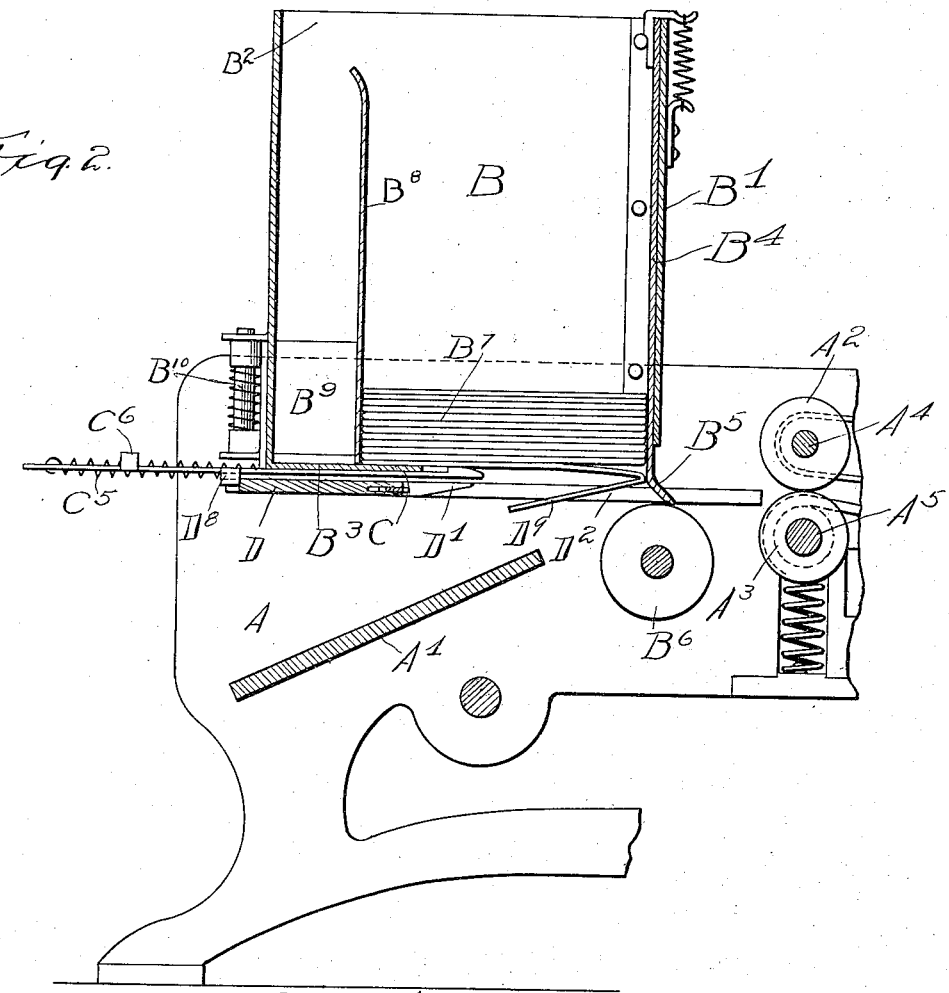
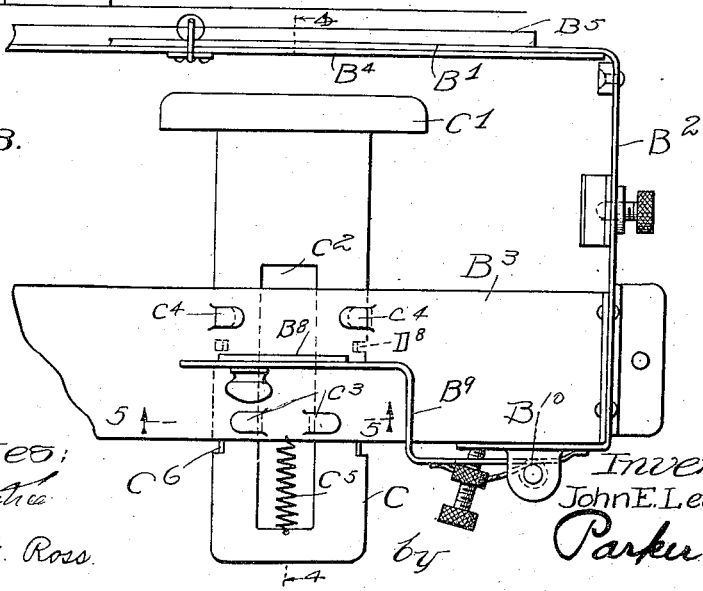
Witnesses:
Lillian G. Ross
Inventor
John E. Lederman
by Parker & Carter
Attys

UNITED STATES PATENT OFFICE.

JOHN E. LEDERMAN, OF CHICAGO, ILLINOIS, ASSIGNOR, BY MESNE ASSIGNMENTS, TO MULTIPOST COMPANY, OF ROCHESTER, NEW YORK, A CORPORATION OF NEW YORK.

ENVELOP SEALING AND STAMPING MACHINE.

1,157,113.   Specification of Letters Patent.   Patented Oct. 19, 1915.

Original application filed October 2, 1911, Serial No. 652,229. Divided and this application filed June 24, 1912. Serial No. 705,406.

*To all whom it may concern:*

Be it known that I, JOHN E. LEDERMAN, a citizen of the United States, residing at Chicago, in the county of Cook and State of Illinois, have invented a certain new and useful Improvement in Envelop Sealing and Stamping Machines, of which the following is a specification.

My invention, which is based on subject-matter divided out of my prior application No. 652,229, filed October 2, 1911, relates to improvements in envelop sealing and stamping machinery and has for one object to provide a new and improved means for feeding the envelops from a containing hopper or supply pocket to the sealing and stamping device as illustrated diagrammatically in one form of the accompanying drawings, where-in—

Figure 1 shows a detailed plan view of a portion of the sealing and stamping machine with my device attached; Fig. 2 is a section along line 2—2 of Fig. 1; Fig. 3 is a detailed fragmentary plan view of the bottom of the receiving hopper; Fig. 4, a section along line 4—4 of Fig. 3; Fig. 5 is a section along line 5—5 of Fig. 3.

Like letters refer to like parts throughout the several drawings.

The side frames A of the sealing and stamping machine, indicated only in part, are connected by the inclined cross bar $A^1$, and carry the two feed rollers $A^2$, $A^3$ on the shafts $A^4$, $A^5$ and are driven by the gears $A^6$, $A^7$ from any suitable driving means not shown.

The hopper B, which is made up of the front wall $B^1$ and the side walls $B^2$ supporting the half bottom $B^3$, is rigidly mounted on the frames A and has the slidable shutter or gate $B^4$ slidably mounted on the front wall $B^1$ and is provided with the outward and downward projection $B^5$ riding on the floating roller $B^6$. The envelops $B^7$ are contained within the hopper, resting upon the half-bottom $B^3$ and either remain in a horizontal position or drop down on the floating roller $B^6$ as the case may be. The vertical guide $B^8$, mounted on the pivoted arm $B^9$, is held by means of the spring $B^{10}$ against the rear edge of the envelops $B^7$ and holds them pressed forwardly into position on the front of the hopper so that they contact at the forward edges the sliding gate $B^4$.

The reciprocating false bottom C, having the extending T-head $C^1$, is slotted at $C^2$ and held in slidable position beneath the bottom $B^3$ by the lugs $C^3$ and $C^4$. The tension spring $C^5$, located in the slot $C^2$ attached at one end to the bottom $B^3$ and at the other end to the false bottom C, holds the false bottom C yieldingly in a forward position as indicated in Fig. 3, thus supporting the envelops in a horizontal position. The lugs $C^6$ upwardly projecting from the false bottom C strike the bottom $B^3$ and limit the forward motion of the false bottom C. The envelop feeding plate D, having the chisel-shaped edge $D^1$ is slidably mounted at either end in the slots $D^2$ in the side pieces A and is reciprocated by the arms $D^3$ which are mounted on the shaft $D^5$ and whose ends are slidable in the blocks $D^4$ which blocks are pivoted on the opposed ends of the envelop feeding plate. The link $D^6$ is pivotally mounted on one of the arms $D^3$ and attached at the other end on the crank $D^7$ on the roller shaft $A^4$ so that the rotation of the roller causes the envelop feeding plate D to reciprocate. The lugs $D^8$ downwardly project from the false bottom C in the path of the envelop feeding plate D and are adapted to be struck by it on the rearward motion so that the false bottom may be retracted when the feeding plate is retracted, thus permitting the envelops to drop so that the upper and inner surfaces of the flaps $D^9$ may be contacted by the chisel edge $D^1$.

It will be evident that while I have shown in my drawings an operative device, still many changes might be made in size, shape and arrangement of parts without departing materially from the spirit of my invention and I wish, therefore, that my drawings be regarded as in a sense diagrammatic.

The use and operation of my invention are as follows: The envelops are placed in the envelop hopper back down, that is with the flap on the down side in such manner that the top edge of the envelop faces the feed rollers. The machine is then started, the rollers rotate and the crank on the drive shaft reciprocates the envelop feeding plate. This plate feeds forward over the moistening roller and engages the inside of the flap of the envelop; it then feeds forward past the downwardly depending apron in the envelop hopper, raising it to permit the passage of a single envelop. The false or movable bottom in the hopper comes forward with the envelop feed plate, thus holding the column of envelops stiff, preventing their sagging down. This prevents the flap on the next to the last envelop in the pile from catching any obstructions or perforations in the bottom envelop. The envelop is fed over the large idler roll upon which the apron rests and the pressure of the apron on the envelop and roll brings the flap up against the envelop feeding plate which meanwhile has been moistened by the moistening roller, thus moistening the flap. The feed strip goes on until the envelop is inserted between the first feed rolls, when it withdraws, allowing the envelops to be fed through the machine by the feed rolls. As the envelop feeding strip moves forward after the envelop has been allowed to drop down by the withdrawal of the false bottom, it permits the false bottom to come with it and for a major portion of its stroke the front edge of the false bottom is in front of the edge of the envelop feeding strip, and thus at no time do any of the envelops in the hopper rest upon the feeding strip, and it is only after the envelop has been withdrawn from the bottom of the pile that the feeding strip supports it and then it only supports a single envelop. The curved front edge of the false bottom of course permits the false bottom, as it feeds forward, to straighten up the envelops and arrange them in their original horizontal position without distorting them or catching them on any projecting parts.

The idea of the function of the false bottom is that owing to the arrangement of the parts when the false bottom and the feeding plate have been withdrawn to allow the envelop and flap $D^9$ to drop down there will be more or less sagging of the envelop pile and this sagging would permit the envelops to be supported at one end on the part $B^3$ and at the other on the roller $B^6$. When the envelops are in this position there will be a tendency for the envelop, if provided with the front aperture so frequent nowadays for the address, to catch on the flap of the envelop immediately above it and this would crumple and tear the envelops. The function of the false bottom is to hold the envelops in a horizontal position and prevent their sagging when the feed strip begins to feed the bottom envelop or slide it from the bottom of the pile. It will at once be evident that some such support is needed to prevent this jarring and catching of the envelops, for the feed plate itself could not be relied upon because it is placed so low down that the envelops would still sag and also because, owing to its light weight, its thinness and its rapid movement, the weight of the envelop column would be very undesirable. Moreover, the envelop feed plate must have a sharp edge to engage the inner portion of the flap and feed it between the part $B^3$ and the roller $B^6$, and this sharp edge might cut or mar or otherwise damage the envelop if it were allowed to touch the envelop pack after it has sunk down to permit the flap to drop to a point where the envelop feed plate can act upon it. The curved edge of the stiff, heavy, slowly moving, spring actuated false bottom fulfils all the necessary functions and supports the envelop column as above noted in such position that the danger of any catching of the adjacent envelops one upon the other is entirely obviated.

I claim:

1. In an envelop feeding machine, an envelop hopper the bottom of which is open to permit the flap of the lowermost envelop to drop down, means for engaging said flap to feed the envelop transversely from the hopper, and a reciprocating false bottom arranged to close the open bottom of the hopper as the lowermost envelop is being removed.

2. In an envelop sealing and stamping machine an envelop hopper the bottom of which is open to permit the flap of the lowermost envelop to drop down, an envelop feeding plate arranged to engage with the flap of the lowermost envelop and a reciprocating false bottom located above said feeding plate.

3. In an envelop sealing and stamping machine an envelop hopper the bottom of which is open to permit the flap of the lowermost envelop to drop down, an envelop feeding plate arranged to engage with the flap of the lowermost envelop and a reciprocating false bottom located above said feeding plate, and means for interposing said bottom between said feeding plate and the envelops before the feeding plate commences to move the bottom envelop in the hopper.

4. In an envelop sealing machine, an envelop hopper having a two-part bottom, one of which parts is arranged to be withdrawn from below the envelops, leaving the hopper bottom open to permit the flap of the lowermost envelop to drop down, a reciprocating envelop feed plate, and means for causing the movable part of the hopper bottom to reciprocate in unison with the feed plate.

5. In an envelop feeding machine a hopper having an open bottom through which the flap of the lowermost envelop may drop, a feeding plate and means for reciprocating said plate to engage the flap and feed the envelop laterally out of the hopper and reciprocating means for supporting the envelops in said hopper while said feeding plate is operating.

6. In an envelop feeding machine a hopper having an open bottom through which the flap of the lowermost envelop may drop, a feeding plate and means for reciprocating said plate to engage the flap and feed the envelop laterally out of the hopper and reciprocating means for supporting the envelops in said hopper while said feeding plate is operating, said means comprising a reciprocating false bottom operating in unison with said feeding plate.

7. In an envelop feeding machine a hopper and a support along one side of the bottom thereof, a slidably mounted bottom member carried by said support and adapted to be projected beyond its inner edge to form a continuation of the hopper bottom and means for alternately drawing said member beneath said support and projecting it therefrom.

8. The combination with an envelop containing hopper and means for feeding envelops therefrom of a two-part bottom therefor, said bottom being located above the feeding means, and means for reciprocating part of said two-part bottom.

9. The combination with an envelop containing hopper and means for feeding envelops therefrom of a two-part bottom therefor, and means for reciprocating part of said two-part bottom in unison with the feeding means whereby as the feeding means operate to deliver an envelop, the said part of the bottom is moved to support the envelops, and when the feeding means are retracted and inoperative, the said part of the bottom is withdrawn from below the envelops.

10. The combination with an envelop containing hopper and means for feeding envelops therefrom of a two-part bottom therefor, said bottom being located above the feeding means, and means for reciprocating part of said two-part bottom in unison with the feeding means whereby as the feeding means operate to deliver an envelop, the said part of the bottom is moved to support the envelops, and when the feeding means are retracted and inoperative, the said part of the bottom is withdrawn from below the envelops.

11. The combination with an envelop containing hopper and means for feeding envelops therefrom of a two-part bottom therefor, and means for reciprocating part of said two-part bottom responsive in their operations to the reciprocations of the feeding means.

12. The combination with an envelop containing hopper and means for feeding envelops therefrom of a two-part bottom therefor, said bottom being located above the feeding means, and means for reciprocating part of said two-part bottom whereby it is carried under the envelops in the hopper while the feeding means deliver an envelop therefrom and is withdrawn from beneath the envelops while the feeding means are inactive responsive in their movements to the reciprocations of the feeding means.

13. The combination with an envelop containing hopper of a horizontally disposed fixed plate on one side of the bottom, a roller on the other side of the bottom and a false bottom reciprocating between said plate and said roller.

14. The combination with an envelop containing hopper of a horizontally disposed fixed plate on one side of the bottom, a roller on the other side of the bottom and a false bottom reciprocating between said plate and said roller and means for feeding envelops from said hopper across said roller.

15. The combination with an envelop containing hopper of a horizontally disposed fixed plate on one side of the bottom, a roller on the other side of the bottom and a false bottom reciprocating between said plate and said roller, and means for feeding envelops from said hopper across said roller, said reciprocating bottom being operated by the envelop feeding means.

16. A feeding device for envelops and the like comprising a hopper having a rigid bottom along one side leaving the opposite side of the bottom open, a false bottom slidably mounted on said rigid bottom adapted to be projected over to fill the space left unfilled by the rigid bottom, and means for feeding material from the hopper, the false bottom being movable in unison with the feeding means.

17. A feeding device for envelops and the like comprising a hopper having a rigid bottom along one side, a false bottom slidably mounted on said rigid bottom adapted to project over to fill the space left unfilled by the rigid bottom, means for feeding material from the hopper, the false bottom being movable in unison with the feeding means, yielding means for forcing the false bottom inwardly to fill the open space, and a connection between the false bottom and the feeding means whereby the false bottom is withdrawn when the feeding means are moved rearwardly.

Signed at Chicago, Illinois, U. S. A., this 21st day of June, 1912.

JOHN E. LEDERMAN.

Witnesses:
 FRANCIS W. PARKER, Jr.,
 LILLIAN G. ROSS.